United States Patent [19]

Shields et al.

[11] Patent Number: 4,554,001
[45] Date of Patent: Nov. 19, 1985

[54] VARIABLE INDEX GLASS WARE PRESS WITH COMPUTER CONTROL

[75] Inventors: Ronald H. Shields, Alexandria; Micheal E. Pollen, Fairmont, both of Ind.

[73] Assignee: Lynch Machinery, Anderson, Ind.

[21] Appl. No.: 533,505

[22] Filed: Sep. 19, 1983

[51] Int. Cl.$^4$ .................. C03B 11/02; C03B 11/16
[52] U.S. Cl. ............................ 65/160; 65/308; 65/309; 65/311
[58] Field of Search .............. 65/308, 309, 311, 160

[56] References Cited

U.S. PATENT DOCUMENTS

| | | | |
|---|---|---|---|
| 2,235,129 | 3/1941 | Vining et al. ............... | 65/311 X |
| 3,362,807 | 1/1968 | Wiley ........................... | 65/308 |
| 4,203,753 | 5/1980 | Liebal et al. ................ | 65/309 |

OTHER PUBLICATIONS

"The Application of Electronic Control to a Multistation Press", E. Proffitt, *Glass Technology*, vol. 17, No. 6, Dec. 1976, pp. 249-251.

*Primary Examiner*—Arthur Kellogg
*Attorney, Agent, or Firm*—Allegretti, Newitt, Witcoff & McAndrews, Ltd.

[57] ABSTRACT

A variable index molding press having a mold table rotatably placed on a base including a plurality of mold positions on the table for locating various numbers of molds thereon with molding means on the base for cooperating successively with one or all of the molds on the said table at a molding station, table drive means for rotating the table, electronic index control means connected to the drive table means and the molding means including a digital computer programmed for number, type and spacing of the molds, molding times for controlling and synchronizing the molding and the table rotation and a time signal source adapted to generate time representative signals to the computer.

8 Claims, 7 Drawing Figures $T_1$ - START GATHERING DEVICE
$T_2$ - LOCATOR PIN
$T_3$ - PRESS HEAD
$T_4$ - SEPARATOR PIN
$T_5$ - MOLD SPIN SLOW
$T_6$ - MOLD SPIN FAST
$T_7$ - TAKE OUT OUT
$T_8$ - TAKE OUT LIFT
$T_9$ - TAKE OUT JAWS
$T_{10}$ - MOLD SPRAY

VARIABLE INDEX GLASS WARE PRESS WITH COMPUTER CONTROL

BACKGROUND OF THE INVENTION

This invention relates to industrial glass molding.

The art of industrial glass molding has focused upon high speed, constant operation, single article glass molding apparatus. This focus has been to the exclusion of lower speed, intermittently operating apparatus for custom article manufacture. High speed equipment is unsuitable for such manufacture, because the equipment requires too many molds; lacks adaptability to differing types of molds, numbers of molds, and molding techniques; is complex to the point of prohibitive cost; too large; and immobile. Custom article glass molding has been left to manual equipment.

SUMMARY OF THE INVENTION

An object of the inventors in making this invention was to fill the need of custom glass article manufacture for a versatile, mobile, and relatively low cost molding apparatus.

Another object of the inventors was to provide a semi-automatic molding apparatus capable, if desired, of essentially automatic, higher than manual speed operation, and yet also capable, if desired, of essentially manual, individual article molding operation.

Thus, the invention is, in a principal aspect, a variable index molding press comprising a mold table rotatably mounted on a base, selectable molding mechanisms, table drive means and index control means. The table includes a plurality of circumferentially spaced mold positions for locating from one to a plurality of molds of a plurality of types thereon. The selectable molding mechanisms are readily selectable for cooperating successively with from one to all of the molds on the table, at a molding station. The table drive means drivably rotates the table, and the index control means controls the drive means for selectively, successively indexing from one to all of the mold positions on the table to the molding station.

With the apparatus as described, selected and only selected molds may be indexed to the molding station. Selected types of molding may be accomplished at the molding station, in substantially any order and number desired.

DETAILED DESCRIPTION OF THE PREFERRED EMBODIMENT

Figure 1:
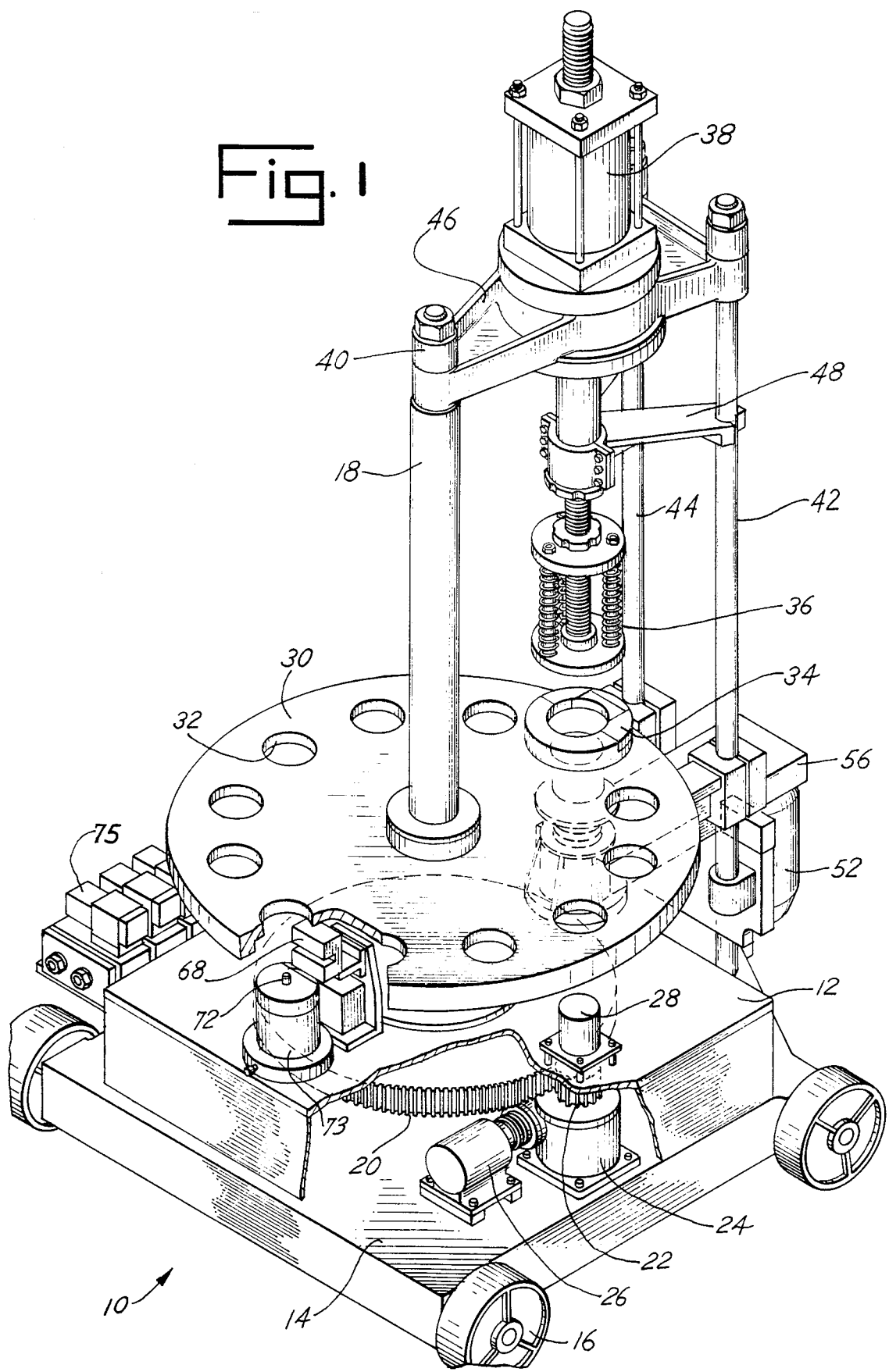
FIG. 1 is a perspective view of the preferred molding press, with pneumatic and electrical control lines removed and portions cut away, to reveal detail.

Referring to FIG. 1, the preferred embodiment of the present invention is a variable index molding press generally designated 10. A base 12, including a sub base 14, is supported on wheels 16. Thus, the press 10 is movable to automatic gob or charge feeding equipment, or elsewhere wherever desired.

Figure 3:
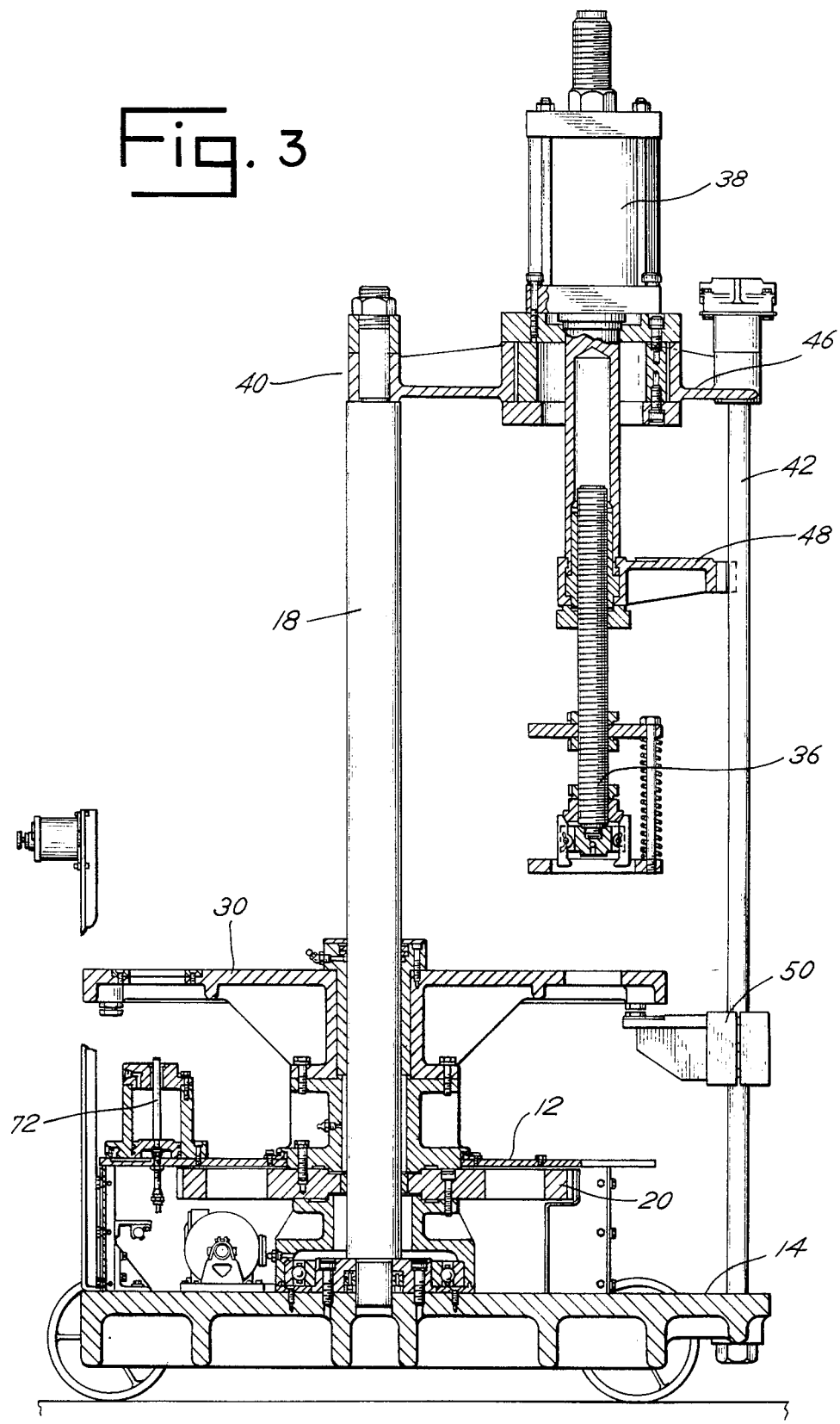
FIG. 3 is a section view of the preferred molding press, taken along line 3—3 of FIG. 2.

An upright, central shaft 18 is bearing mounted on the sub base 14, as shown in FIG. 3. As best seen in FIG. 1, a horizontally oriented bull gear 20 rotates around the shaft 18. The bull gear 20 is driven by a pinion gear 22, located atop a gearbox 24. An electric drive motor 26 drives the gearbox 24, and thereby the pinion gear 22, bull gear 20, around central shaft 18. A rotary encoder 28 atop the base 12 reads the position of the shaft of the pinion gear 22.

A horizontally oriented, circular mold table 30 is mounted around shaft 18, above the base 12. The table 30 is rotatable around the shaft 18, and thereby driven by the drive motor 26. The table 30 includes a plurality, specifically twelve, of mold locations defined by mold receiving openings 32. The mold locations are circumferentially spaced about the table 30, at equal radii from the shaft 18 and at equal arcs thereabout. The mold openings 32 are adapted to receive a plurality of molds of a plurality of types for a plurality of articles. Each opening 32 receives one mold at a time. For clarity, one such mold, a spinning mold 34, is shown only in FIG. 1.

As should now be evident, the mold table 30 is adapted to receive from one to a plurality of molds, of the types, number, sequence and spacing desired. As a first example, if desired, only one spinning mold 34 may be located on the table 30. As another example, if desired, six spinning molds may be placed on the table 30 at every other mold position. As a third example, if desired, six spinning molds and six plunger molds may be placed on the table 30, with each spinning mold followed by a plunger mold and another spinning mold.

Figure 2:
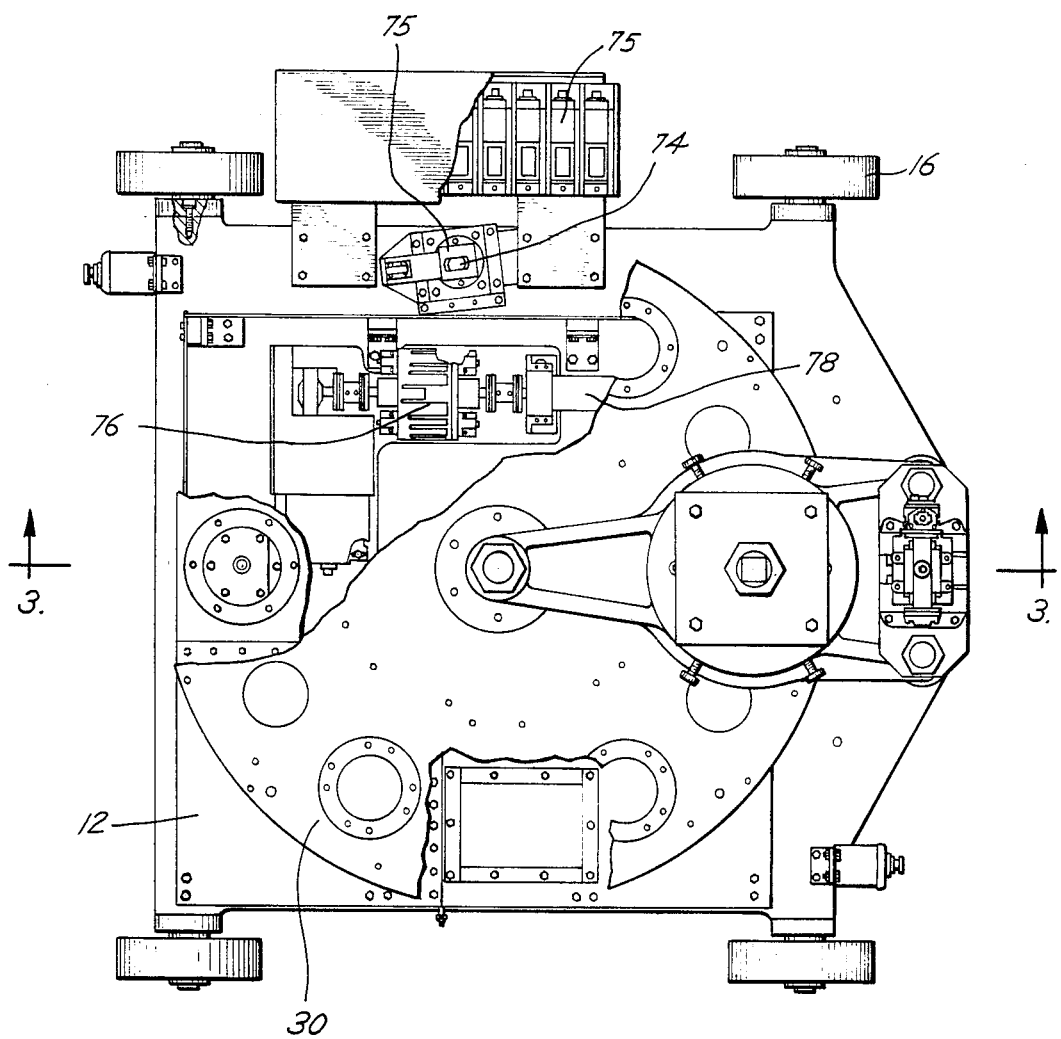
FIG. 2 is a plan view of the preferred molding press, with the lines removed and other portions cut away to reveal detail.

Referring to FIG. 1, two alternate, or selectable, molding mechanisms are provided by the press 10 at a molding station. Referring to FIGS. 1-3, the first such mechanism includes a press head 36 adjustably mounted to a shaft of a press head drive cylinder 38. The drive cylinder 38 is mounted atop a press head tower 40, comprising two spaced, base mounted, guide rods 42, 44 supporting a cross member 46, further supported atop the central shaft 18. The drive cylinder shaft is vertically movable, to advance and retract the press head 36, and any plunger thereon (none is shown) toward and away from any mold positioned therebelow. A guide member 48 slides along the guide rod 42, guiding the reciprocating motion of the press head 36. During extreme advancement of the press head 36, any plunger thereon cooperates with any plunger mold below the press head, at the molding station, to form an article of a charge in the mold. Fixed braces 50 on the guide rods 42, 44 support the mold station portion of the table 30 during plunger molding.

Figure 4:
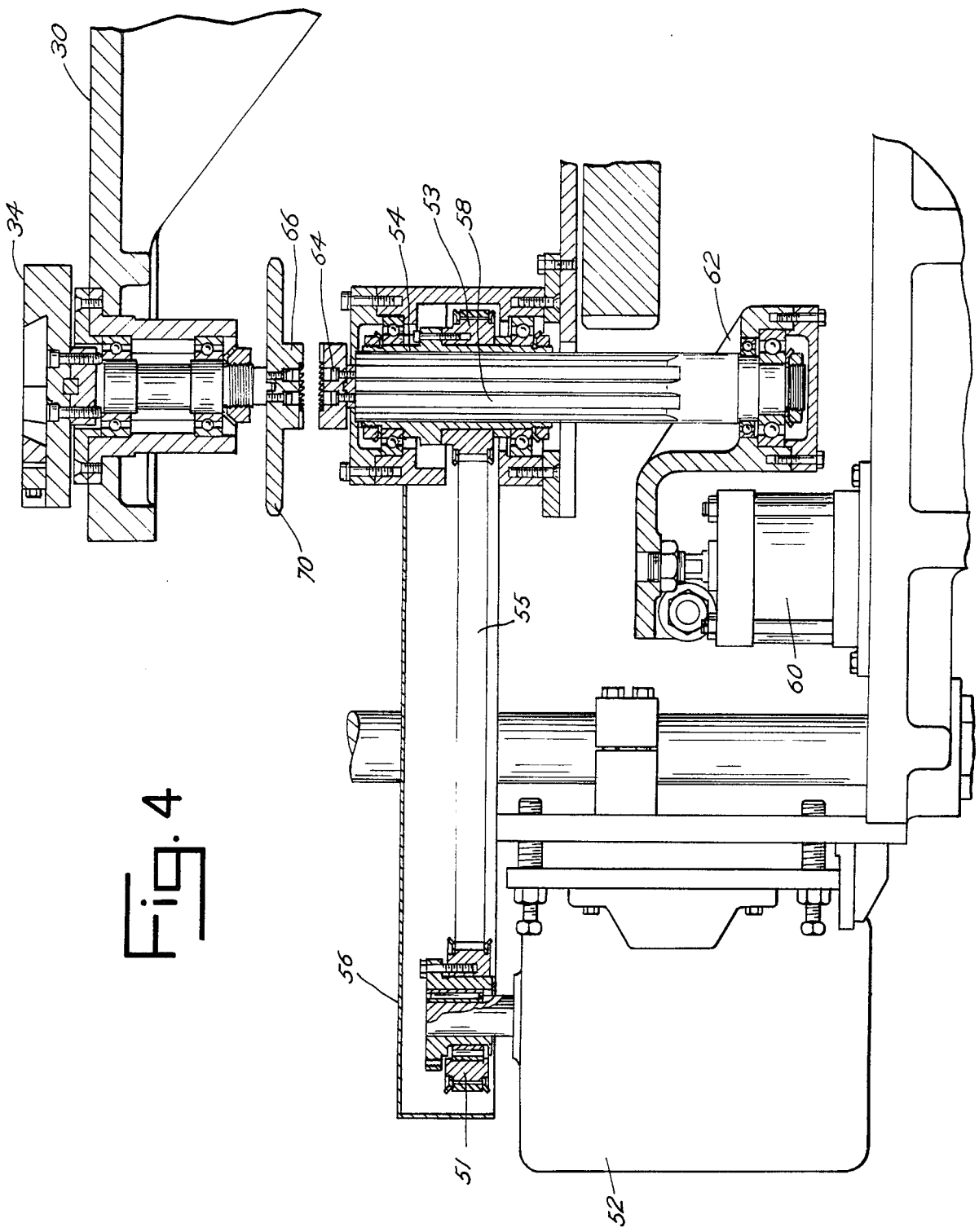
FIG. 4 is a partial section view in the opposite direction of FIG. 3 along line 3—3.

Referring to FIGS. 1 and 4, the second molding mechanism is a mold spinning mechanism including a mold spinning motor 52 supported on the sub base 14 between the guide rods 42, 44. The motor 52 drives a mold spinner 54 through pulleys 51, 53 and a belt 55 within a belt guard 56. The spinner 54 is mounted on the base 12 below the press head 36. A vertically oriented shaft 58 is splined within the spinner 54 and driven vertically by a spinner lifting cylinder 60 through a link 62. A driving clutch member 64 is mounted atop the shaft 58. When lifted, the member 64 engages a driven clutch member 66 on the mold 34. The spinning motion of the spinner 54 then spins the mold 34. When released, the mold 34 continues to spin from momentum.

Opposite the molding station, a mold-article separator mechanism defines a separating station on the press 10. The separator mechanism is accompanied by a brake mechanism including a caliper brake 68, as in FIG. 1 only, for seizing a brake disc 70 of the spinning molds 34, shown in FIG. 4. The separator mechanism, also known as a kick-up mechanism, includes a retractable separating pin 72, best shown in FIG. 3, driven by a cylinder 73, for entering a mold and lifting an article therein, to separate the article from the mold.

As seen in FIG. 2, a locating mechanism is on the base 12 between the separator station and the molding station. The locating mechanism precisely locates the table 30 relative to the base 12, for accurate registration between the molding mechanisms and the molds. A retractable locating pin 74 selectively enters precision made pin openings (not shown) in the underside of the table 30. A locator pin opening is provided for and corresponds to each mold position of the table 30.

The locator mechanism, separator mechanism, and the plunger molding mechanism are pneumatically driven. A bank 75 of electropneumatic controls actuate the mechanisms through pneumatic connections (not shown).

All the aforesaid mechanisms, the mold spinning mechanism, and the table drive are electronically controlled. As shown in FIG. 2, a second, electric, motor 76 operable at a constant speed is located on the base 12. The motor 76 is a timer motion, or resolver drive, and drives a resolver 78. The resolver 78 determines the position of the shaft 81 of the drive 76, and responsively generates an analog signal which varies in accordance with shaft angular rotation.

Figure 5:
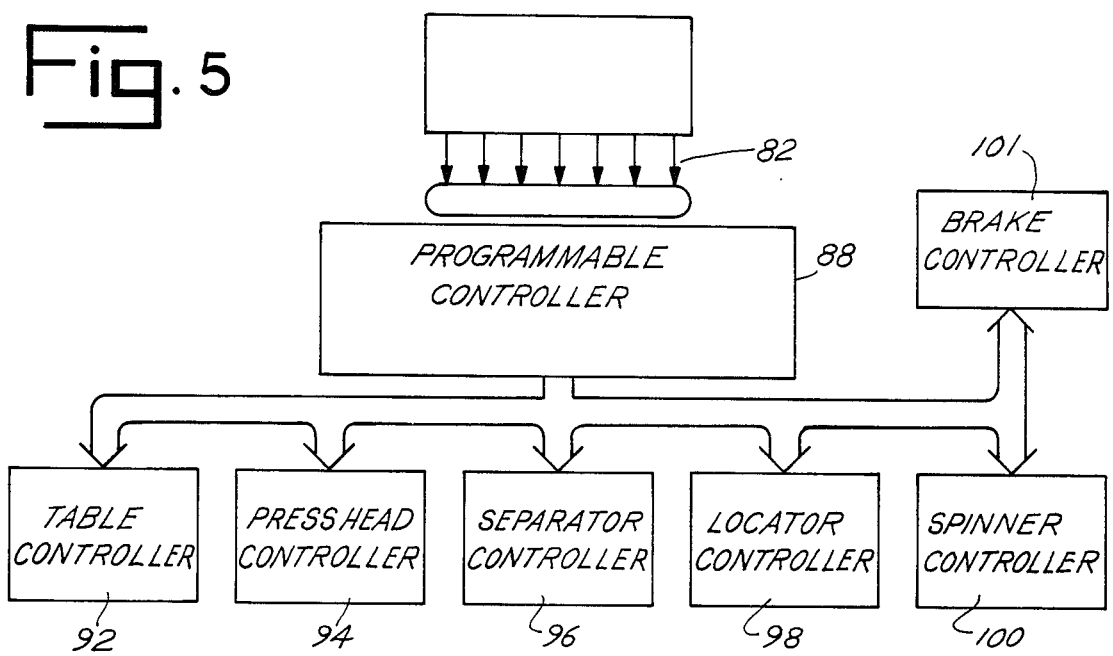
FIG. 5 is a first schematic view of the controls of the preferred molding press.
Figure 6:
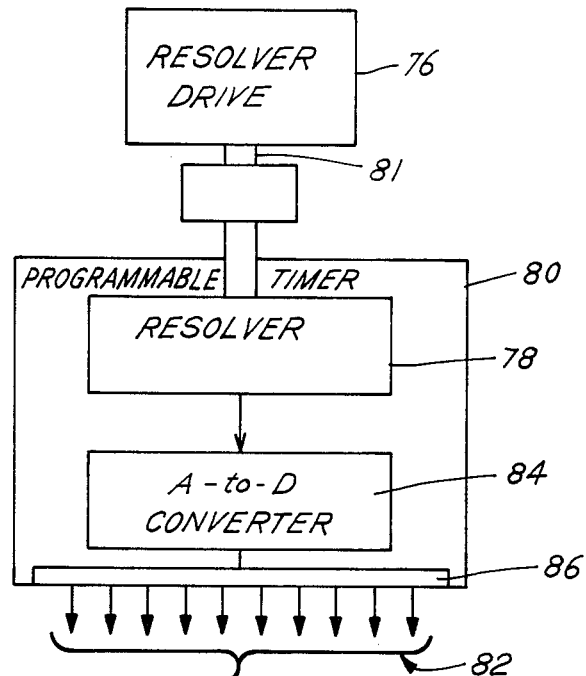
FIG. 6 is a second schematic view of the controls of the preferred molding press.
Figure 7:
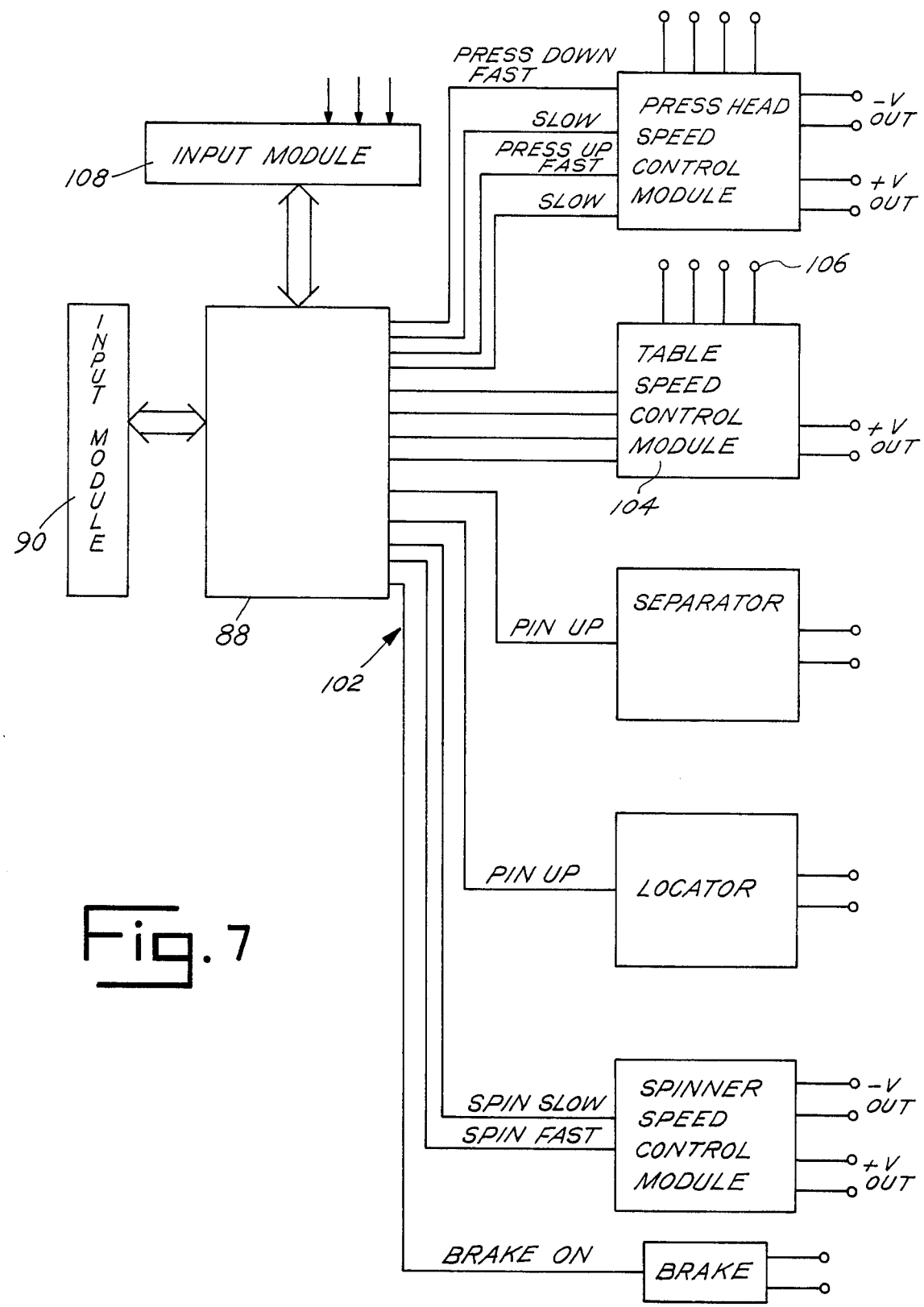
FIG. 7 is a third schematic view of the controls of the preferred molding press.

As shown in FIGS. 5–7, the resolver drive 76 and resolver 78 are part of a programmable time 80. The timer 80 generates digital timing signals along output lines 82. The analog signal of the resolver 78 is converted to a digital signal by an analog-to-digital converter 84. A microprocessor 86 monitors the digital signal output of the converter 84. The microprocessor 86 is programmable for driving each of lines 82 to a logic ON state for generating timing signals $T_1$–$T_{10}$. The signals $T_1$–$T_{10}$ have an ON time initiated by a digital output of the converter 84.

The timing signals are used to initiate operations of the press mechanisms, a charge gathering device and takeout mechanism upon receipt of each successive single glass gob or charge. The charge is received when the shaft 81 is at about 0°, by manual coordination. Thus, the timer 80 generates a number of outputs at different times in the 360° rotation of the shaft 81. FIG. 6 shows, for example, ten timing signals.

The programmable timer 80 is a separately obtainable item from the assignee of this application, Lynch Machinery. The timer is sold under the name P.E.T., Programmable Electronic Timer.

As shown in FIGS. 5 and 7, the signals on lines 82 are fed to a programmable, microprocessor based controller 88, via input modules such as module 90. The controller 88 directs a table controller 92, a press head controller 94, the pneumatic cylinders which are the controllers 96, 98, 101 of the separator, locator and brake mechanisms, and a spinner controller 100.

More specifically, as in FIG. 7, the controller 88 generates output signals upon output control lines 102 to actuate the mechanisms discussed. As an example, signals along the control lines 102 drive a table speed control module 104 to generate voltages to power the motor 26. The speed control module 104 receives four inputs from the controller 88. The module responds to each input by generating a voltage output of a particular set magnitude. Each particular voltage is set by a control knob among knobs 106 on the module 104. Similar modules are used and driven for the spinner and press head. The remaining output control lines actuate air valves to drive the pneumatic cylinders of the locator, separator and brake.

Additional input to the controller 88, or CPU, may be made via an input module 108. Electrical signals fed to the module 108 may be used as safety devices to override the timing instructions $T_1$ through $T_{10}$. For example, position switches may be disposed about the press 10 for generating electrical signals to module 108 indicative of the mechanisms reaching particular positions of movement. The controller 88 may be programmed, for example, not to react to time signal $T_1$ to move the table 30 if the controller 88 has not first received an indication from a position switch that the locator pin is down, in its proper position for table rotation.

The programmer controller 88 is also programmable for the number, type and spacing of molds placed on the mold table 30. As an example, the controller 88 is programmable for six spin molds at every other mold position on the table 30, to refrain from driving the press head 36, and to rotate the table uninterruptedly past mold positions without molds.

The controllers 88, 92, 94, 100 are further programmable and adjustable to mold parameters such as molding type and time. As an example, the spinning molds may be ramped up to a spin at low speed and held at that speed for a selected interval, then allowed to coast briefly, and finally ramped up and held at a high speed. The molds may be left to coast. Alternatively, the molds may be spun in another manner desired, and decelerated to rest.

The invention, and the manner and process of making and using it, are now described in such full, clear, concise and exact terms as to enable any person skilled in the art to which it pertains, to make and use the same. The best mode contemplated by the inventors of carrying out the invention is set forth. It is to be understood, of course, that the foregoing describes a preferred embodiment of the present invention and that modifications may be made therein without departing from the spirit or scope of the present invention as set forth in the appended claims. To particularly point out and distinctly claim the subject matter regarded as invention, the following claims conclude this specification.

We regard as invention and claim:

1. A variable index molding press comprising:
    a base;
    a mold table rotatably mounted on the base, including a plurality of mold positions for locating from one to a plurality of molds thereon;
    molding means on the base for cooperating successively with from one to all of the molds on the mold table, at a molding station;
    table drive means operatively connected to the mold table for drivably rotating the mold table; and electronic index control means electrically operatively connected to the table drive means and the molding means for electronically controlling the table drive means and electronically controlling the molding means in synchronism with the table drive means, including a digital computer being programmable for the number, type and spacing of molds on the mold table, and being programmable for mold parameters such as molding time, and a time signal source adapted to generate time representative signals to the computer, the computer controlling and synchronizing the molding means and the table drive means based on the time representative signals, the control means thereby automatically indexing only programmed ones of the mold positions to the molding station for a variety of numbers and spacings of the molds, whereby only programmed mold positions with molds may be indexed to the molding station, at will.

2. A press as in claim 1 in which the mold table has twelve mold positions for locating from one to twelve molds thereon, and in which the index control means is programmable to index from one to twelve mold positions with molds to the molding station.

3. A press as in claim 1 in which the molding means includes a retractable press head and press head tower for press molding of articles, the press head being on the press tower and the press tower being on the base at the molding station, the computer being electrically operatively connected to and controlling the press head.

4. A press as in claim 1 or 3 in which the mold positions are adapted to receive spin molds and the molding means includes a mold spinner adapted to spin mold articles in the spin molds by centrifugal force, the computer being electrically operatively connected to and controlling the mold spinner.

5. A press as in claim 1 further comprising a locking mechanism on the base adapted to releasably lock the mold table relative to the molding means and when any of the mold positions are at the molding station, the computer being electrically operatively connected to and controlling the locking mechanism.

6. A press as in claim 5 in which the computer is adapted to coordinate actions of the table drive means, the molding means and the locking mechanism.

7. A press as in claim 1 further comprising an article and mold separating mechanism adapted to separate articles from the molds the computer being electrically operatively connected to and controlling the article and mold separating mechanism.

8. A press as in claim 7 in which the computer is further adapted to coordinate actions of all the table drive means, the molding means, the locking mechanism and the separating mechanism.

* * * * *